(12) United States Patent
Kaneta

(10) Patent No.: US 10,651,714 B2
(45) Date of Patent: May 12, 2020

(54) RESOLVER ROTOR AND ROTATING ELECTRICAL MACHINE INCLUDING SAME

(71) Applicant: HONDA MOTOR CO., LTD., Tokyo (JP)

(72) Inventor: Kazuya Kaneta, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 30 days.

(21) Appl. No.: 16/225,737

(22) Filed: Dec. 19, 2018

(65) Prior Publication Data

US 2019/0199187 A1    Jun. 27, 2019

(30) Foreign Application Priority Data

Dec. 22, 2017   (JP) .................................. 2017-245709

(51) Int. Cl.
| | |
|---|---|
| H02K 24/00 | (2006.01) |
| H02K 1/28 | (2006.01) |
| H02K 7/00 | (2006.01) |
| G01B 7/00 | (2006.01) |
| H02K 11/225 | (2016.01) |

(52) U.S. Cl.
CPC .............. *H02K 24/00* (2013.01); *G01B 7/00* (2013.01); *H02K 1/28* (2013.01); *H02K 7/003* (2013.01); *H02K 11/225* (2016.01); *H02K 2213/03* (2013.01)

(58) Field of Classification Search
CPC ...... H02K 24/00; H02K 29/12; H02K 11/225; G01D 5/2046
See application file for complete search history.

(56) References Cited

U.S. PATENT DOCUMENTS

| | | | |
|---|---|---|---|
| 8,232,693 B2* | 7/2012 | Coleman ................ | H02K 24/00 310/216.114 |
| 8,674,687 B2* | 3/2014 | Kikuchi ............... | G01D 5/2046 29/598 |
| 2005/0035675 A1* | 2/2005 | Yamaguchi ............. | B60K 6/26 310/68 R |

FOREIGN PATENT DOCUMENTS

JP    2014-159990 A    9/2014

* cited by examiner

*Primary Examiner* — Dang D Le
(74) *Attorney, Agent, or Firm* — Rankin, Hill & Clark LLP

(57) ABSTRACT

There is provided a resolver rotor in a resolver provided to a rotating electrical machine. The resolver rotor is formed from an annular body. A phase determination hole for setting a relative position to a shaft of a motor is provided at a near outer peripheral portion of the resolver rotor. A virtual circle is set which comes into contact with a section of the phase determination hole at a proximal end to an inside diameter of the resolver rotor, and has a center point coincident with the center of the resolver rotor. A pair of hole portions are arranged at portions extending from the virtual circle to an outside diameter side of the resolver rotor while taking in the virtual circle.

6 Claims, 4 Drawing Sheets

RESOLVER ROTOR AND ROTATING ELECTRICAL MACHINE INCLUDING SAME

BACKGROUND OF THE INVENTION

1. Field of the Invention

The present invention relates to a resolver rotor in a resolver to detect a rotational angle of a rotating electrical machine such as a motor, and to a rotating electrical machine including the same.

2. Description of the Related Art

A rotational angle sensor such as a resolver has heretofore been used for detecting a rotational position of a rotating electrical machine like a motor, for example. The resolver includes a resolver rotor to be fixed to a spindle of the rotating electrical machine, and a resolver stator to be fixed to a case of the rotating electrical machine.

Regarding the resolver rotor, the applicant of the present invention has proposed a resolver rotor which is capable of reducing press-fit stress to be generated at the resolver rotor and securing a sufficient press-fit area of a resolver rotor for a shaft (see Japanese Patent Application Publication No. 2014-159990).

SUMMARY OF THE INVENTION

In the meantime, further relaxation of the press-fit stress will be required in order to deal with further increases in output and speed of the rotating electrical machine such as a motor to be anticipated in the future.

The present invention has been made as an improvement of the precedent proposal by the applicant of the present invention. An object of the invention is to provide a resolver rotor and a rotating electrical machine including the same, which are capable of further relaxing stress concentration attributed to press-fit stress and the like.

To attain the above-described object, the present invention provides a resolver rotor in a resolver provided to a rotating electrical machine, in which the resolver rotor is formed from an annular body, a positioning hole for setting a relative position to a shaft of the rotating electrical machine is provided at a near outer peripheral portion of the resolver rotor, a virtual circle is set which comes into contact with a section of the positioning hole at a proximal end to an inside diameter of the resolver rotor, and has a center point coincident with a center of the resolver rotor, and a hole portion is arranged at a portion extending from the virtual circle to an outside diameter side of the resolver rotor while taking in the virtual circle.

According to the present invention, it is possible to obtain a resolver rotor and a rotating electrical machine including the same, which are capable of further relaxing stress concentration attributed to press-fit stress and the like.

DETAILED DESCRIPTION OF THE EMBODIMENTS

Figure 1:
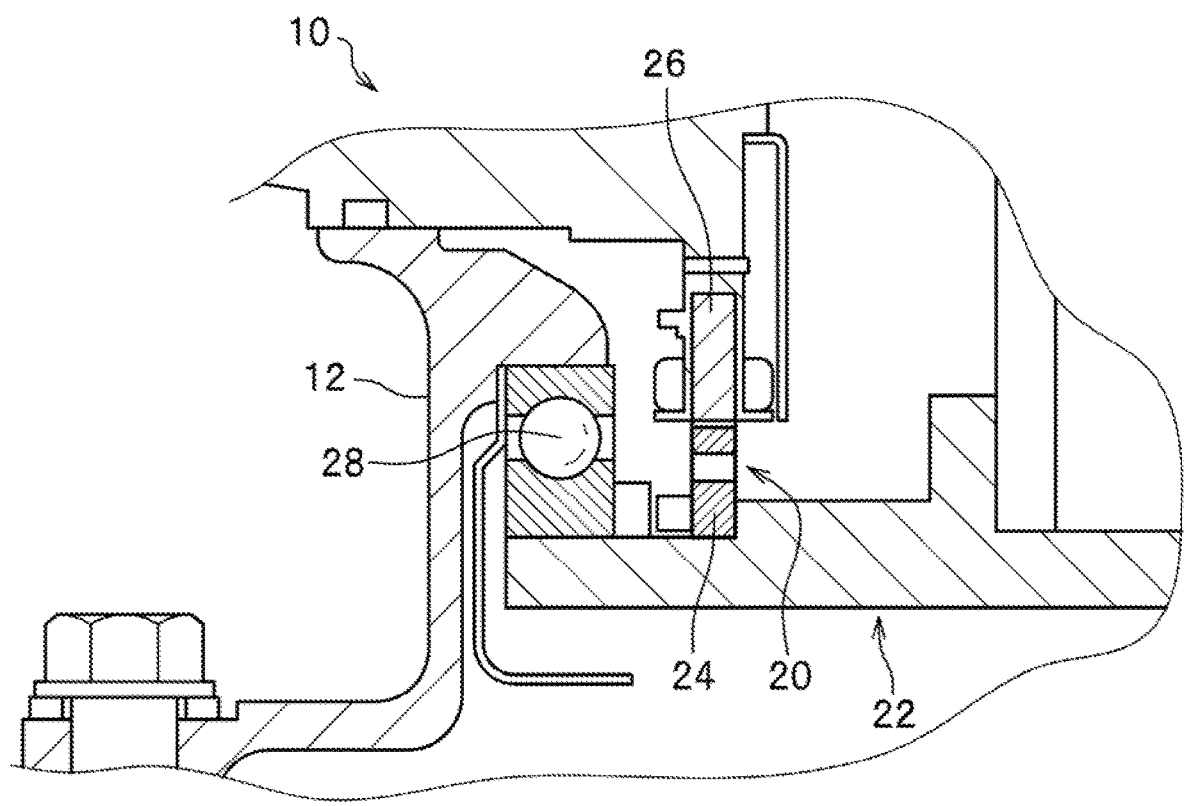
FIG. 1 is a schematic partial cross-sectional view of a motor including a resolver rotor according to an embodiment of the present invention.
Figure 2:
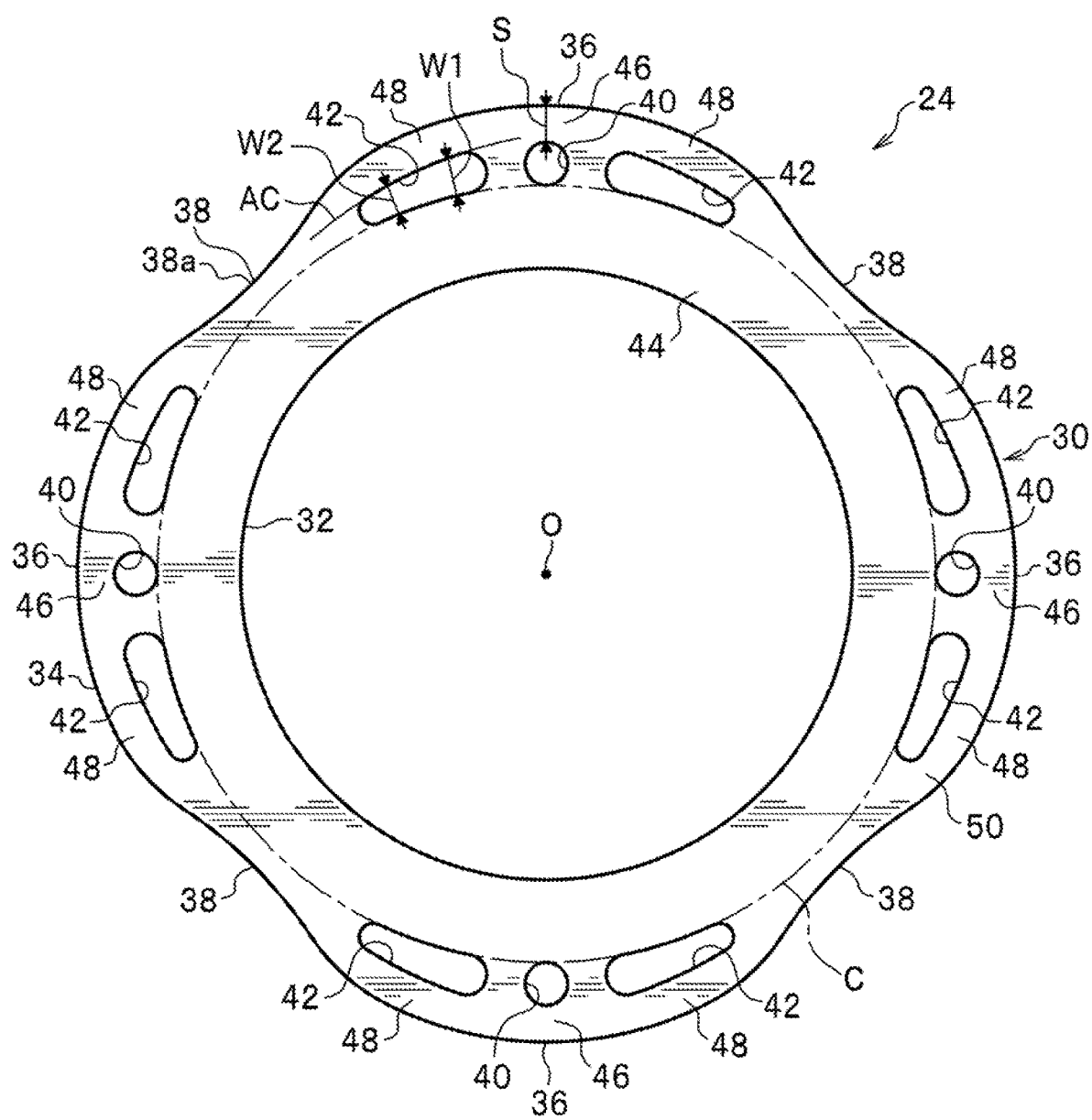
FIG. 2 is a plan view of the resolver rotor shown in FIG. 1.

Next, embodiments of the present invention will be described in detail with reference to the accompanying drawings as appropriate. FIG. 1 is a schematic partial cross-sectional view of a motor including a resolver rotor according to an embodiment of the present invention and FIG. 2 is a plan view of the resolver rotor shown in FIG. 1.

A motor (a rotating electrical machine) 10 according to the embodiment of the present invention includes a motor housing 12, a not-illustrated stator, a rotor, and a resolver 20 which are housed in the motor housing 12. The motor 10 is constructed as a brushless motor, for example.

The stator includes U-phase, V-phase, and W-phase windings each wound around an iron core, and the respective windings are deployed at regular intervals along an inner periphery of the motor housing 12. The rotor includes a shaft (a rotor shaft) 22 serving as a spindle, and a rotor core. The rotor core is constructed as a laminated body formed by laminating multiple electromagnetic steel sheets and swaging the laminated sheets together. Another rotor (not shown) to which a pair of permanent magnets to generate a magnetic field are fitted is provided to an end portion in an axial direction of the shaft 22.

As shown in FIG. 1, the resolver 20 is provided to another end portion in the axial direction of the shaft 22. The resolver 20 includes a resolver rotor 24 to be press-fitted into the other end portion of the shaft 22, and a resolver stator 26 located on an outside diameter side of the resolver rotor 24 and fitted to a fitting surface of the motor housing 12. Here, the one end portion and the other end portion in the axial direction of the shaft 22 are rotatably supported by bearings 28 fixed to the motor housing 12. Note that FIG. 1 illustrates only the bearing 28 on the other end side that rotatably supports the other end portion of the shaft 22 and omits illustration of the bearing 28 on the one side.

The resolver rotor 24 includes an annular rotor body 30 which is constructed as a laminated body formed by laminating silicon steel sheets. As shown in FIG. 2, the rotor body 30 is constructed as a flat-plate annular body that includes an inner peripheral portion 32 and an outer peripheral portion 34. The inner peripheral portion 32 has a constant inside diameter and is formed from a circular through-hole that penetrates both front and back surfaces. The outer peripheral portion 34 is formed such that curved portions 36 and arc-shaped recesses 38 are alternately and continuously provided in a circumferential direction. The multiple (four in this embodiment) curved portions 36 are arranged in the circumferential direction and at a separation angle of about 90°. Each curved portion 36 is curved substantially into an arc shape in plan view, and projects radially outward. The multiple (four in this embodiment) arc-shaped recesses 38 are arranged between the curved portions 36 that are adjacent in the circumferential direction. Each arc-shaped recess 38 is formed in such a way as to sink radially inward gently. Here, the center of the arc-shaped recess 38 is formed from a bottom part 38a that sinks in deepest toward the inner peripheral portion 32.

The curved portions 36 are provided with four phase determination hole portions (positioning holes) 40, respectively, which are formed into a small circular shape in plan view and are arranged in the circumferential direction at a separation angle of about 90° (equiangular separation). The phase determination hole portions 40 are provided in order to set a relative position between the shaft 22 and the resolver rotor 24 when the resolver rotor 24 is press-fitted into the shaft 22 at the time of assembly. To be more precise, each phase determination hole portion 40 is provided in order to establish phase matching in such a way that the center position between a pair of permanent magnets provided to a yoke (not shown) that constitutes the motor 10 coincides in the radial direction with the center of the phase determination hole portion 40.

The phase determination hole portions 40 are arranged at a near outer peripheral part that is closer to the outer peripheral portion 34 than to the inner peripheral portion 32 in terms of the radial direction. Here, the number of the phase determination hole portions 40 is not limited only to four. In other words, at least four phase determination hole portions 40 need to be provided therein.

In FIG. 2, a dash-dotted line indicates a virtual circle C, which is centered at a center point O of the inner peripheral portion 32 (the resolver rotor 24) and is in contact with a section of each phase determination hole portion 40 at a proximal end to the inside diameter of the resolver rotor 24. Although this embodiment supposes the virtual circle C that extends across the entire circumference of the resolver rotor 24, an arc (part of the virtual circle C) in contact with the section of each phase determination hole portion 40 at the proximal end to the inside diameter of the resolver rotor 24 may be taken into consideration instead.

A pair of hole portions 42 in mutually line-symmetrical shapes are formed on two sides in the circumferential direction of each phase determination hole portion 40. In other words, the pair of hole portions 42 formed into the mutually line-symmetrical shapes are arranged on the two sides in the circumferential direction across the phase determination hole portion 40. In each hole portion 42, a width in the radial direction (a dimension in the radial direction) of the hole portion 42 is gradually reduced (W1>W2) in a direction away from an end close to the phase determination hole portion 40 along the circumferential direction. Inside parts of the pair of hole portions 42 are in contact with the virtual circle C.

An inside-diameter annular portion 44 of the resolver rotor 24 extending from the inner peripheral portion 32 to the virtual circle C along the direction of the outside diameter is formed thick at a thickness T0, and is thus kept at a desired thickness.

A first thick portion 46 is provided on the outside diameter side of each phase determination hole portion 40 and on the outer peripheral portion side of the resolver rotor 24. Here, portions between the phase determination hole portion 40 and the hole portions 42 arranged on the two sides thereof in the circumferential direction are formed as thick as the first thick portion 46.

A thickness T1 of the first thick portion 46 is set smaller than the thickness T0 of the inside-diameter annular portion 44 of the resolver rotor 24 extending from the inner peripheral portion 32 to the virtual circle C along the direction of the outside diameter (a portion from the inner peripheral portion 32 of the resolver rotor 24 to the innermost position of the phase determination hole portion 40) (the thickness T0>the thickness T1). Meanwhile, a second thick portion 48 that continues from the first thick portion 46 in the circumferential direction is provided on an outside diameter side of each of the pair of hole portions 42. A thickness T2 of the second thick portion 48 is as large as the thickness T1 of the first thick portion 46 (the thickness T1=the thickness T2) or nearly equal thereto (the thickness T1≈the thickness T2).

In other words, the inside-diameter annular portion 44 of the resolver rotor 24 extending from the inner peripheral portion 32 to the virtual circle C in the radial direction is formed at the thickness T0 which is relatively thick. On the other hand, an outside-diameter annular portion 50 of the resolver rotor 24 extending from the virtual circle C as a boarder to the outer peripheral portion 34 in the radial direction (inclusive of the first thick portion 46 and the second thick portions 48) is formed thin at the thicknesses T1 and T2 being smaller than the thickness T0.

The resolver rotor 24 according to the embodiment is basically constructed as described above. Next, operation and effects of the resolver rotor 24 will be discussed.

First, a description will be given of a shape as well as a method of setting a position of the hole portions 42 to be arranged on the two sides in the circumferential direction of each phase determination hole portion 40. Here, the shapes of the inner peripheral portion 32 and the outer peripheral portion 34 of the resolver rotor 24 are assumed to be determined in advance.

The multiple phase determination hole portions 40 each formed of a small circle are arranged in the circumferential direction of the resolver rotor 24. In this case, each phase determination hole portion 40 is set closer to an outer edge of the curved portion 36 than to the center position between the inner peripheral portion 32 and the outer edge of the curved portion 36 of the outer peripheral portion 34 in terms of the radial direction of the resolver rotor 24. Here, a separation distance (an offset distance S) in the radial direction between a section of each phase determination hole portion 40 at a proximal end to the outside diameter and the outer edge of the curved portion 36 is set in advance. As shown in FIG. 2, the offset distance S is provided in order to set the first thick portions 46 and the second thick portions 48 which secure the required minimum thicknesses at the outside-diameter annular portion 50 of the resolver rotor 24.

Subsequently, the virtual circle C is set which comes into contact with a section of each phase determination hole portion 40 at a proximal end to the inside diameter of the resolver rotor 24. The virtual circle C is assumed to be the circle that comes into contact with the portions of the multiple phase determination hole portions 40 at the proximal ends to the inside diameter of the resolver rotor 24, respectively. A virtual arc AC (see FIG. 2) is set in such a way as to be located closer by the offset distance S from the outer edge of the curved portion 36 toward the inside diameter, and is defined as an outside diameter line of the hole portions 42. An inside diameter line of the hole portions 42 corresponds to the outside diameter line, which is determined along the virtual circle C. Here, the center point of the virtual arc AC is set to a position (not shown) deviated from the center point O of the resolver rotor 24.

The shape and the position of each hole portion 42 are set by joining a certain end of the outside diameter line of the hole portions 42 to a certain end of the inside diameter line thereof with a curve, and joining the other end of the outside diameter line to the other end of the inside diameter line with a curve. Note that the above-described setting of the hole portion 42 explains the hole portion 42 on one side in the circumferential direction of the corresponding phase determination hole portion 40. Regarding the hole portion 42 on the other side in the circumferential direction of the phase determination hole portion 40, the shape and the position are similarly set along the outside diameter line and the inside diameter line.

Figure 3:
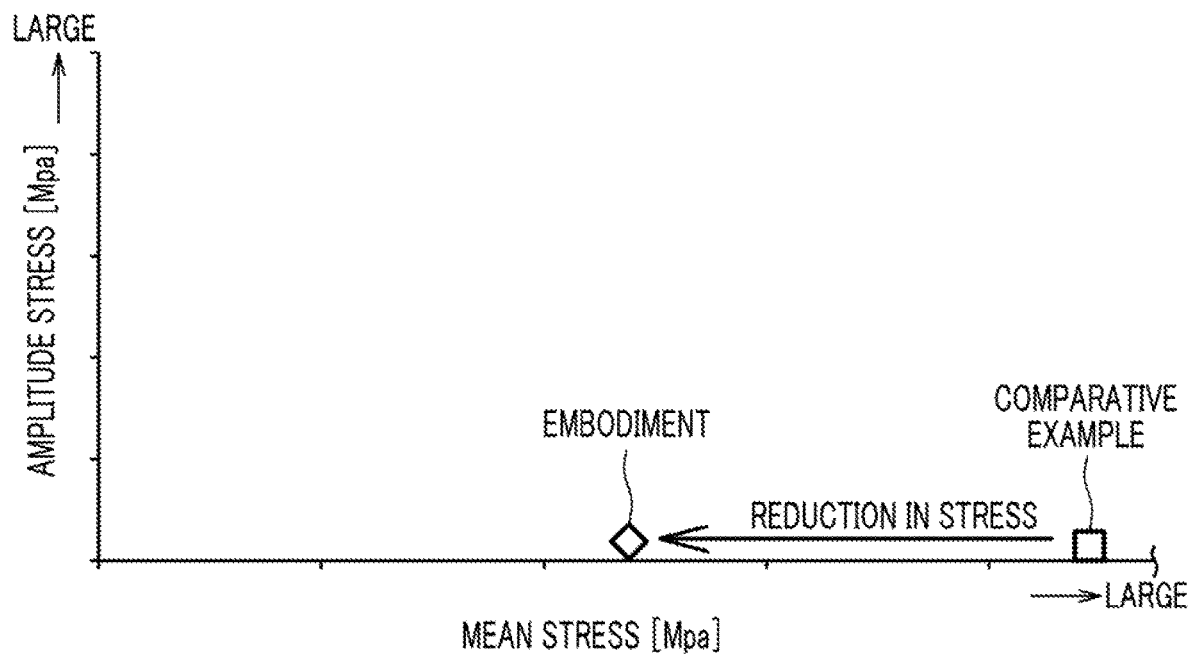
FIG. 3 is an explanatory diagram showing a relation between mean stress to be applied to a phase determination hole portion and amplitude stress in the case of the resolver rotor according to the embodiment and in the case of a resolver rotor of a comparative example devised by the applicant of the present invention.

FIG. 3 is an explanatory diagram showing a relation between mean stress to be applied to the phase determination hole portion and amplitude stress in the case of the resolver rotor according to the embodiment and in the case of a resolver rotor of a comparative example devised by the applicant of the present invention. In this embodiment, the pair of hole portions 42 are formed on the two sides in the circumferential direction of each phase determination hole portion 40. On the other hand, the comparative example adopts a resolver rotor not provided with the pair of hole portions 42.

Specifically, when the resolver rotor 24 is press-fitted into the shaft 22 at the time of assembly, stress concentrates on the inside diameter of the phase determination hole portion 40 as compared to other sites of the resolver rotor 24, whereby the inside diameter of the phase determination hole portion 40 is deformed. In this regard, the stress generated at the inside diameter of the phase determination hole portion 40 when the resolver rotor 24 is press-fitted into the shaft 22 at the time of assembly is compared with the same stress in the comparative example. As shown in FIG. 3, according to the embodiment in which the pair of hole portions 42 are formed on the two sides in the circumferential direction of the phase determination hole portion 40, the mean stress generated at the time of the press-fitting associated with the assembly is successfully reduced as compared to the comparative example not provided with the pair of hole portions 42.

Figure 4:
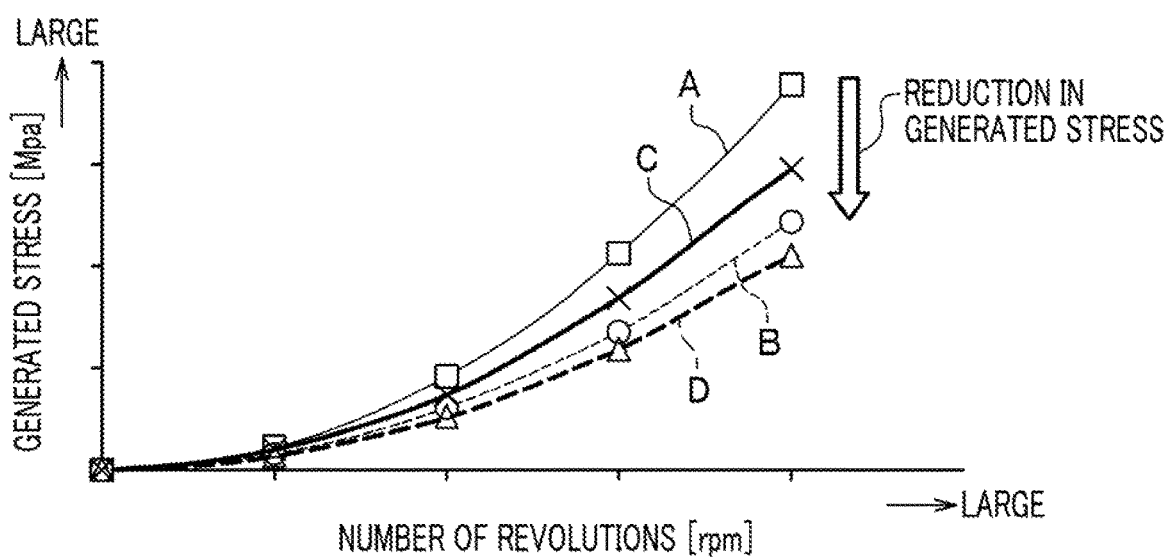
FIG. 4 is an explanatory diagram in which the resolver rotors of the embodiment and the comparative example during high-speed rotation are compared to each other in terms of sites of stress generation.

Meanwhile, FIG. 4 is an explanatory diagram in which the resolver rotors of this embodiment and the comparative example during high-speed rotation are compared to each other in terms of sites of stress generation. Here, (the inside diameter of) the phase determination hole portion 40 and the bottom part 38a of the arc-shaped recess 38 which is the closest part of the outer peripheral portion 34 to the inner peripheral portion 32 are separately measured as the sites of stress generation, respectively. Note that the shapes of the resolver rotors 24 of the embodiment and the comparative example are the same as those mentioned with reference to FIG. 3.

A characteristic curve A (a thin solid line) that joins marks "□" represents stress generated at the phase determination hole portion 40 in the comparative example, and a characteristic curve B (a thin dash line) that joins marks "○" represents stress generated at the bottom part 38a of the arc-shaped recess 38 in the comparative example, respectively. In the meantime, a characteristic curve C (a bold solid line) that joins marks "x" represents stress generated at the phase determination hole portion 40 in this embodiment, and a characteristic curve D (a bold dash line) that joins marks "Δ" represents stress generated at the bottom part 38a of the arc-shaped recess 38 in this embodiment, respectively.

When the characteristic curve A of the comparative example is compared with the characteristic curve C of this embodiment, the stress (MPa) generated at the phase determination hole portion 40 of this embodiment is lower than the stress generated at the phase determination hole portion 40 of the comparative example during the high-speed rotation by increasing the number of revolutions (rpm) of the respective resolver rotors 24.

Meanwhile, when the characteristic curve B of the comparative example is compared with the characteristic curve D of this embodiment, the stress generated at the bottom part 38a of the arc-shaped recess 38 of this embodiment is lower than the stress generated at the bottom part 38a of the arc-shaped recess 38 of the comparative example during the high-speed rotation by increasing the number of revolutions of the respective resolver rotors 24. As a result, in this embodiment, the stress generated at both sites of the phase determination hole portion 40 and the arc-shaped recess 38 is reduced as compared to the comparative example.

Accordingly, this embodiment can reduce each of press-fit stress to be generated when the resolver rotor 24 is press-fitted into the shaft 22 at the time of assembly, and centrifugal stress to be generated during the high-speed rotation of the resolver rotor 24.

Specifically, the phase determination hole portions 40 are arranged at the near outer peripheral part of the resolver rotor 24 in this embodiment. The virtual circle C is set which comes into contact with a location of each phase determination hole portion 40 (in the phase determination hole portion 40) proximal to the inside diameter of the resolver rotor 24, and which has the center point O coincident with the center of the resolver rotor 24 (see FIG. 2). The pair of hole portions 42 are arranged on the two sides in the circumferential direction of the phase determination hole portion 40. Here, each hole portion 42 extends from the virtual circle C to the outside diameter side while taking in the virtual circle C (inclusive of the periphery of the virtual circle C).

In this embodiment, the pair of hole portions 42 are arranged at the outside-diameter annular portion 50 having the smaller thickness than that of the inside-diameter annular portion 44, or in other words, at the portion extending from the virtual circle C to the outside diameter side while taking in the virtual circle C. For this reason, when the stress is generated in this embodiment, a tensile force is generated in such a way as to evenly pull the whole circumference of the outside-diameter annular portion 50 of the resolver rotor 24. As a consequence, according to the embodiment, the stress is prevented from concentration and dispersed in the outside-diameter annular portion 50 (the first thick portions 46 and the second thick portions 48). Thus, it is possible to favorably relax the stress generated in the outside-diameter annular portion 50.

In this embodiment, the thickness of the inside-diameter annular portion 44, which is located inside of the virtual circle C as the border, is increased while the thickness of the outside-diameter annular portion 50 (the first thick portions 46 and the second thick portions 48) located outside thereof is reduced. In this way, according to this embodiment, it is possible to secure a desired thickness of the outside-diameter annular portion 50 and to withstand any of the press-fit stress and the centrifugal stress at the same time.

Moreover, in this embodiment, the pair of hole portions 42 are arranged on the two sides in the circumferential direction across the phase determination hole portion 40. Thus, it is possible to balance the stress relaxation in terms of the circumferential direction.

Furthermore, in this embodiment, the inside diameter of each of the pair of hole portions 42 extends along the virtual circle C, and a width W in the radial direction of the hole portion 42 is gradually reduced in the circumferential direction away from a site near the phase determination hole portion 40 (see FIG. 2). In other words, in this embodiment, each hole portion 42 is formed in such a way as to extend from the site near the phase determination hole portion 40 toward the bottom part 38a of the arc-shaped recess 38 of the outer peripheral portion 34 along the virtual circle C. At the same time, the width W in the radial direction of each hole portion 42 is gradually reduced in accordance with the direction of extension.

In this way, according to the embodiment, it is possible to favorably disperse not only the press-fit stress to be generated at the inside diameter of the phase determination hole portion 40, but also the centrifugal stress to be generated at the arc-shaped recess 38 of the outer peripheral portion 34 at the time of assembly with the shaft 22. In the vicinity of the bottom part 38a of the arc-shaped recess 38, a portion radially outside the virtual circle C is formed in the small thickness. Due to this structure, the centrifugal stress generates the force to pull the portion in the vicinity of the bottom part 38a of the arc-shaped recess 38 to one side (in a clockwise direction) as well as to the other side (in a counterclockwise direction) in the circumferential direction. Nonetheless, the hole portions 42 can disperse and relax this tensile force.

Figure 5:
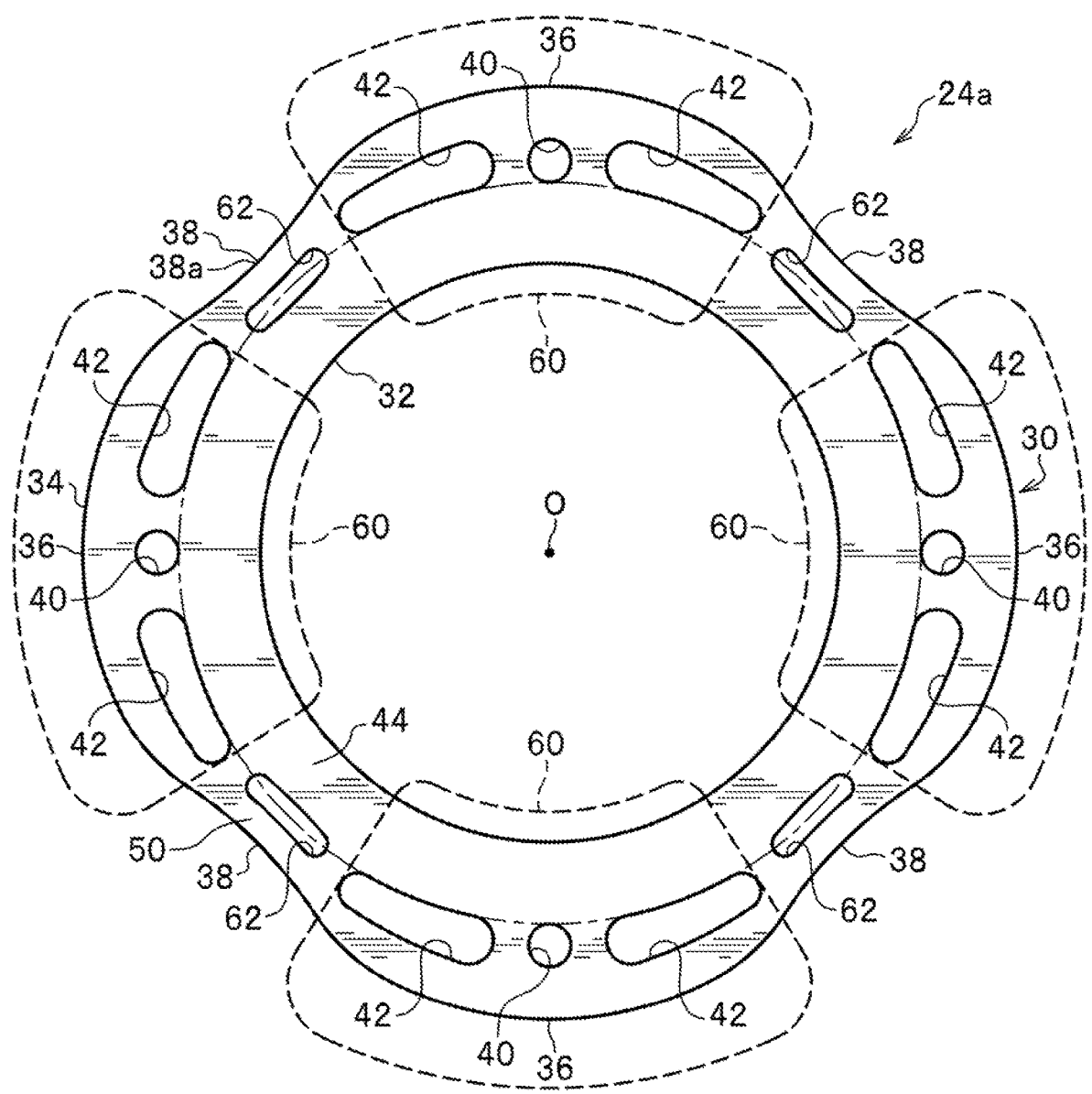
FIG. 5 is a plan view of a resolver rotor according to another embodiment of the present invention.

FIG. 5 is a plan view of a resolver rotor according to another embodiment of the present invention.

A resolver rotor 24a according to the other embodiment includes hole portion units 60 each of which includes the phase determination hole portion 40, and the pair of hole portions 42 arranged on the two sides in the circumferential direction across the phase determination hole portion 40. The four hole portion units 60 are arranged in the circumferential direction of the resolver rotor 24a. Another hole portion 62 is arranged between every pair of the hole portion units 60 that are adjacent to each other in the circumferential direction.

The other hole portion 62 is located at a position corresponding to the center of the bottom part 38a of the arc-shaped recess 38 in terms of the radial direction passing through the center point O, and is formed into an oval shape which is elongated in the circumferential direction. In the meantime, the width in the radial direction of the other hole portion 62 is formed almost constant along the direction of extension. In addition, the other hole portion 62 is formed from both the inside-diameter annular portion 44 located inside the virtual circle C and the outside-diameter annular portion 50 located outside the virtual circle C. As a consequence of arranging the other hole portions 62, it is possible to disperse the centrifugal stress at the outer peripheral portion 34 and to further relax the stress concentration in this embodiment.

The motor 10 of this embodiment includes resolver rotor 24a configured to disperse and relax both of the press-fit stress to be generated at the time of assembly and the centrifugal stress to be generated during the high-speed rotation. In this way, it is possible to improve accuracy to detect the rotational angle of the motor 10.

What is claimed is:

1. A resolver rotor in a resolver provided to a rotating electrical machine, wherein
   the resolver rotor is formed from an annular body,
   a positioning hole for setting a relative position to a shaft of the rotating electrical machine is provided at a near outer peripheral portion of the resolver rotor,
   a virtual circle is set which comes into contact with a section of the positioning hole at a proximal end to an inside diameter of the resolver rotor, and has a center point coincident with a center of the resolver rotor, and
   a hole portion is arranged at a portion extending from the virtual circle to an outside diameter side of the resolver rotor while taking in the virtual circle.

2. The resolver rotor according to claim 1, wherein
   a first thick portion is provided on an outside diameter side of the positioning hole and on an outer peripheral side of the resolver rotor,
   a thickness of the first thick portion is set smaller than a thickness at a portion from an inner peripheral portion of the resolver rotor to an innermost position of the positioning hole,
   a second thick portion which continues from the first thick portion is provided on an outside diameter side of the hole portion and on the outer peripheral side of the resolver rotor, and
   the second thick portion is formed at a thickness as large as the thickness of the first thick portion.

3. The resolver rotor according to claim 1, wherein
   the hole portions are arranged on two sides in a circumferential direction across the positioning hole, respectively.

4. The resolver rotor according to claim 1, wherein
   an inside diameter of the hole portion extends along the virtual circle, and
   a width in a radial direction of the hole portion is gradually reduced in a direction away from an end close to the positioning hole and along a circumferential direction.

5. The resolver rotor according to claim 3, comprising:
   a hole portion unit including the positioning hole and the pair of hole portions arranged on the two sides in the circumferential direction across the positioning hole, wherein
   a plurality of the hole portion units are arranged in the circumferential direction of the resolver rotor, and
   another hole portion is arranged between every pair of the hole portion units being adjacent to each other in the circumferential direction.

6. A rotating electrical machine comprising the resolver rotor according to claim 1.

* * * * *